Figure 1:
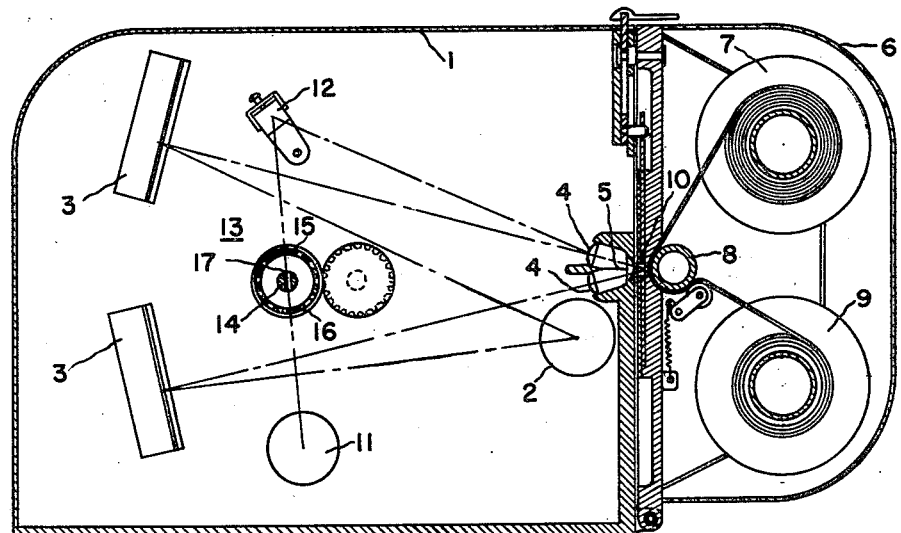

Dec. 10, 1957     F. BARANOWSKI, JR., ET AL     2,816,002
OSCILLOGRAPH TIMING LINE MECHANISM

Filed June 1, 1954     2 Sheets—Sheet 1

Inventors:
Frank Baranowski, Jr.
Joseph L. Paine
by, Richard E. Hosley
Their Attorney Dec. 10, 1957   F. BARANOWSKI, JR., ET AL   2,816,002
OSCILLOGRAPH TIMING LINE MECHANISM Filed June 1, 1954                    2 Sheets-Sheet 2

Inventors:
Frank Baranowski, Jr.
Joseph L. Paine
by, Richard E. Horley
Their Attorney

United States Patent Office 2,816,002
Patented Dec. 10, 1957

2,816,002

OSCILLOGRAPH TIMING LINE MECHANISM

Frank Baranowski, Jr., Stoneham, and Joseph L. Paine, Marblehead, Mass., assignors to General Electric Company, a corporation of New York Application June 1, 1954, Serial No. 433,682

5 Claims. (Cl. 346—107)

This invention relates to oscillographs and in particular to apparatus or mechanisms therein for forming timed indicia or markings on the film as it is passed through the oscillograph and exposed to the various galvanometer light traces. Such devices are commonly referred to as timing line mechanisms.

Once the traces are formed on the film, the completed film record is referred to as an oscillogram, and timed indicia or markings theron are useful in interpreting the results since the various traces can thus be related to a time scale. Timing line mechanisms normally operate to form the timed indicia either by periodically interrupting a light beam which is directed onto the film or, in the alternative, by periodically allowing the light beam to strike the film for a brief instant at timed intervals.

It will be appreciated that the versatility and usefulness of an oscillograph employing such a mechanism will be greatly enhanced if two separate time scales are provided. Thus a time scale can be chosen which can be most easily and accurately interpreted with relationship to the total time period over which the happenings to be recorded may extend.

It is equally desirable, on the other hand, that such a mechanism be simple and inexpensive to manufacture, that it occupy a minimum of space within the oscillograph casing, and further that it be easily adjustable from one scale to the other with a minimum of tedious operations and adjustments.

Accordingly, it is an object of this invention to provide an improved oscillograph timing line mechanism in which at least two separate time scale settings are provided and which is simple and inexpensive to manufacture.

It is another object of this invention to provide an improved oscillograph timing line mechanism having at least two time scale settings, which mechanism can be readily set from one time scale to the other with a minimum of operations and adjustments.

It is a further object of this invention to provide an improved oscillograph timing line mechanism which provides at least two separate scales of timed indicia and which is compact in size and which consequently occupies only a relatively small space in the oscillograph casing.

Briefly stated, in accordance with one embodiment of this invention, a timing shutter such as a cylindrical drum having a plurality of diametrically opposed axially extending slots formed therein is rotatably mounted in the light path between a timing lamp and the oscillograph film. A second timing shutter such as a shaft, having a single slot running all the way through the shaft, is mounted concentrically within the timing drum. Means are provided for either locking the timing shaft in a stationary position with the slot therein aligned with the light beam from the timing lamp, or for locking the timing shaft to the timing drum with the slot in the shaft aligned with a pair of diametrically opposite slots on the drum. The timing drum is connected to be driven by a timing motor which is independent of the film drive mechanism. With the timing shaft locked in the stationary position the time interval between the light impulses striking the film will be determined solely by the number of slots in the timing drum and the speed at which the drum is driven by the timing motor. In other words, the number of light impulses striking the film during each revolution of the timing drum will be exactly equal to the number of slots in the drum, and the time scale with the timing shaft in the stationary position is thus established on that basis.

A second time scale is obtained by locking the timing shaft to the timing drum such that the shaft and drum are rotated together as a unitary assembly. Under such a condition, the light from the timing lamp will be able to pass through the shaft and drum assembly only when the single slot in the shaft is aligned with the light beam, or twice each revolution of the assembly. Thus it can be seen that with the above arrangement the ratio between the two time scales is equal to one half of the ratio between the number of slots in the drum to the number of slots running through the shaft. Therefore, with only one slot in the shaft, the ratio between the time scales is equal to one half of the number of slots in the drum.

It can be appreciated that the same effect could be obtained if more than one slot were provided in the timing shaft so long as the arrangement is such that the slots in the shaft are aligned with cooperating slots in the drum when the shaft and drum are locked together as a unitary assembly and that at least one of the slots in the shaft is aligned with the path of light travel from the timing lamp to the film when the shaft is locked in the stationary position. Then when the timing shaft is locked to rotate with the timing drum, the time interval between the light impulses would be controlled by the number of slots in the timing shaft and conversely, when the shaft is locked in the stationary position the time interval between impulses would be controlled by the number of slots in the drum. Thus the ratio between the two timing scales would still be equal to one-half the ratio between the number of slots in the drum and the number of slots running through the shaft.

Figure 2:
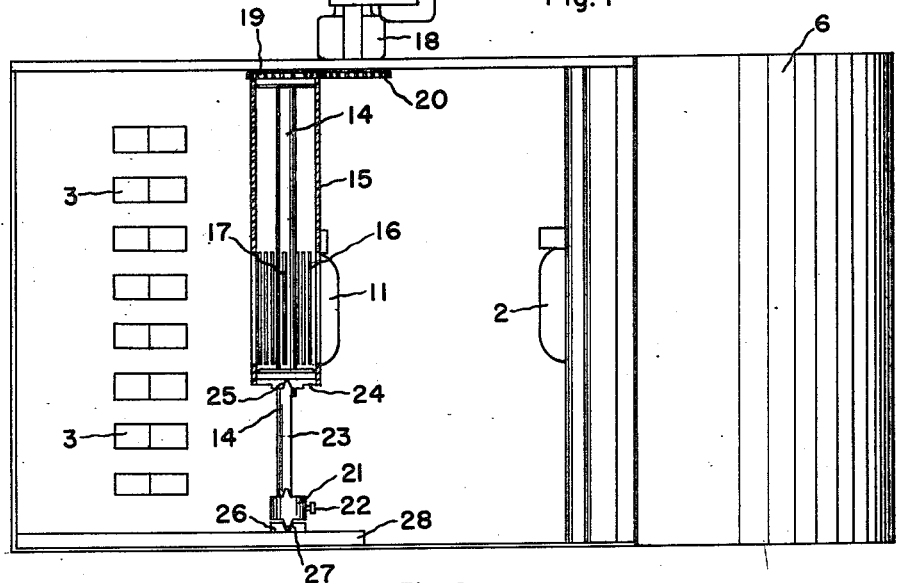
Figure 3:
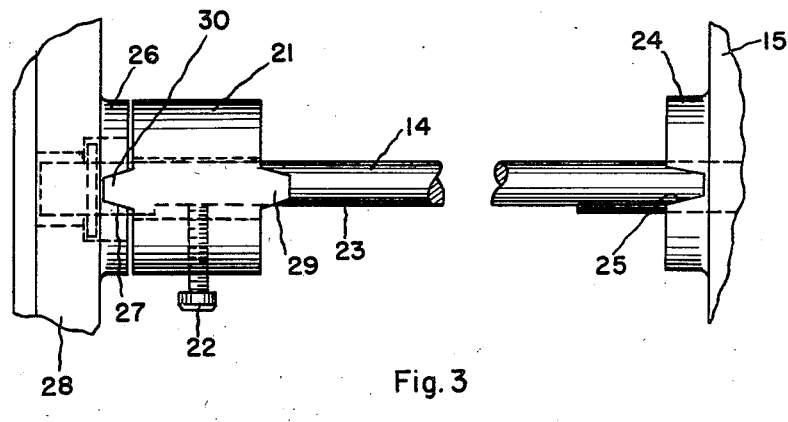
Figure 4:
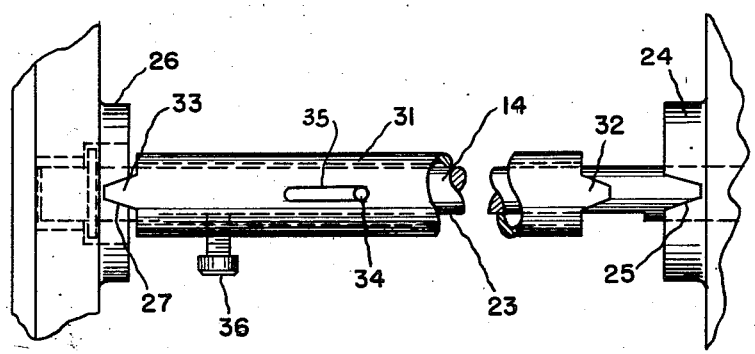

This invention will be better understood and other objects and advantages will be apparent from the following description taken in connection with the accompanying drawings, and its scope will be pointed out in the appended claims. Referring to the drawings, Fig. 1 is an elevational view in cross section of an oscillograph illustrating one embodiment of this invention; Fig. 2 is a plan view, partly in cross section, of the oscillograph illustrated in Fig. 1; Fig. 3 illustrates in detail the arrangement for locking the timing shaft either in the stationary position or to the timing drum; while Fig. 4 illustrates an alternative arrangment to that shown in Fig. 3.

Referring to the oscillograph illustrated in Fig. 1 and embodying this invention, a casing 1 is provided to enclose the usual oscillograph elements such as the light source 2, the galvanometers 3, and suitable focusing lenses 4 and 5. The film holder portion of the oscillograph is enclosed by a cover member 6 and includes a supply spool 7, a film drive spool 8, and a receiving spool 9 for receiving the film after it has been exposed.

The film is exposed to the galvanometer traces through an elongated slot 10 as it passes over the film drive spool 8. A timing lamp 11 is provided together with an adjustable mirror 12 which can be set to direct the light from the lamp through the lenses 4 and 5 and onto the film.

A timing line mechanism, illustrated at 13 is provided to permit the light from the timing lamp 11 to pass at timed intervals to the mirror element 12 and from there onto the film. The timing line mechanism 13 comprises a rotatably mounted timing shutter such as shaft 14 and a second timing shutter such as a drum 15 which is in turn rotatably mounted on and concentrically with the first shutter or shaft 14. The timing drum 15 is provided with a plurality of axially extending slots as illustrated in Figs. 1 and 2. In the embodiment of this invention illustrated herein the timing shaft 14 is provided with a single slot 17 which extends all the way through the timing shaft and over a portion of the axial length of the shaft as illustrated in Figs. 1 and 2.

Means are provided for either locking the timing shaft 14 in a fixed position with the slot 17 therein aligned with the light path between the timing lamp 11 and the mirror element 12 as illustrated in Fig. 1, or in the alternative for locking the shaft 14 to the timing drum 15 such that these two elements rotate together as a unitary assembly with the slot 17 in the shaft aligned with a pair of diametrically opposite slots in the timing drum 15. The arrangement for locking the timing shaft 14 either in the stationary or in the rotatable position will be subsequently explained in detail.

The timing drum 15 is driven at a constant speed by a suitable motor 18 which is preferably either of the synchronous type or of the direct current chronometric governor type, but may, of course, be of any other type having a sufficiently constant speed characteristic for the desired accuracy of the timed indicia. A suitable gearing arrangement, such as gears 19 and 20, may be provided between the drive motor 18 and the drum 15 to achieve the desired rotational speed of the drum.

Referring now to Figs. 2 and 3, a collar or bushing 21 is slidably mounted on the timing shaft 14 and is provided with a set screw 22 which can be tightened to bear against a flat portion 23 provided on the timing shaft 14. An annular flange portion 24 having a pair of diametrically opposed slots 25 therein is provided at one end of the timing drum 15 and is attached integral therewith. A similar flange portion 26, also having a pair of diametrically opposed slots 27 is affixed to a plate member 28 which forms a part of the oscillograph casing assembly.

The slidable bushing 21 is provided at each end thereof with a pair of diametrically opposed extending fingers 29 and 30 which are adapted to engage the slots 25 and 27 in the flange members 24 and 26.

Thus with the bushing 21 in the position shown in Figs. 2 and 3 and with the set screw 22 tightened against the flat portion 23 of the timing shaft 14, the timing shaft is firmly locked in place in the stationary position and the timing drum 15 is free to rotate thereon. The relationship between the various parts of the locking arrangement is such that when the timing shaft 14 is locked in the fixed position as illustrated, the slot 17 in the shaft is aligned with the light beam passing from the timing lamp 11 to the mirror element 12. Thus, with the timing shaft 14 locked in the stationary position the number of light impulses passing through the timing line mechanism during each revolution thereof will be determined solely by the number of slots in the timing drum 15. To give a typical example, if 20 slots are provided in the timing drum and the drum is driven at 300 R. P. M., the time interval between the light impulses will be 0.01 second.

A second time scale can be obtained by merely loosening the set screw 22 and moving the bushing 21 from the position shown to the position wherein the fingers 29 engage the slots 25 on the flange portion 24 of the timing drum. With the set screw 22 locked against the flat portion 23 of the timing shaft in this position, it can be seen that the timing shaft 14 will now be rotated along with the timing drum 15. Here the various components of the locking arrangement are positioned such that the slot 17 in the timing shaft is aligned with a pair of diametrically opposite slots in the timing drum. With the parts locked together in this position light from the timing lamp 11 will be able to pass through the timing line mechanism only twice each revolution thereof or when the single slot 17 in the timing shaft is aligned with the light path from the lamp 11 to the mirror element 12. Thus if the timing line mechanism is driven at 300 R. P. M., as in the previous example, the time interval between the light impulses will now be 0.1 second.

Fig. 4 illustrates an alternative arrangement to that shown in the Fig. 3 for locking the timing shaft 14 in either of the two positions mentioned above. This arrangement comprises a tubular sleeve 31 slidably mounted on the timing shaft 14 and having formed therein projections or fingers 32 and 33 adapted to engage the slots 25 and 27. The sleeve 31 is aligned on the shaft 14 by means of a pin 34 which extends through the shaft 14 and into an elongated slot 35 which is provided in the sleeve 31. A set screw 36 can be tightened against a flat portion 23 on the shaft to prevent axially sliding of the sleeve 31 from one position or the other. Since the shaft is angularly positioned in both of the two locked positions by the pin 34 cooperating with the slot 35, the set screw 36 does not perform that function in the arrangement illustrated in Fig. 4 and is utilized only to prevent axially sliding of the sleeve on the shaft. Hence the sleeve 31 may be held in the axially fixed position by any other suitable means such as by a spring attached to the sleeve and positioned to bear against the shaft to provide a frictional resistance to sliding movement of the sleeve.

Various other arrangements for locking the timing shaft either in the fixed position or so as to be rotatable with the timing drum will occur to those skilled in the art and it will be apparent that variations and modifications of this nature may be employed without departing from the scope of this invention.

It will also be apparent that additional slots may be provided in the timing shaft 14 if so desired. In such a case the locking means would be arranged so that with the timing shaft locked in the stationary position, at least one of the slots in the shaft would be aligned with the path of light travel between the timing lamp 11 and the mirror element 12. Also, if all of the additional slots in the timing shaft 14 were to be utilized, these slots would have to be aligned with corresponding slots in the timing drum 15 when the shaft was locked to the timing drum so as to rotate therewith. It can be appreciated that regardless of the number of slots in the timing shaft 14, the ratio between the two time scales will always be equal to exactly one half the ratio between the number of slots in the timing drum and the number of slots in the shaft.

It will be seen that the above arrangement provides a simple mechanism for obtaining two separate time scales in an oscillograph timing line mechanism. In addition, the scales can be easily changed by means of a very simple operation involving merely loosening the set screw and sliding the bushing 21, or the sleeve 31 in the event that a construction of that type is employed, back and forth between the two settings. It will be further appreciated that the entire arrangement occupies a minimum of space in the oscillograph casing, taking up only slightly more space than would be required for only the single timing drum 15.

It will be apparent from the foregoing that various modifications, changes, substitutions, and combinations may be employed in the application of the teachings set forth herein without departing from the scope of this invention in its broader aspects.

What we claim as new and desire to secure by Letters Patent of the United States is:

1. A timing line mechanism for an oscillograph comprising a tubular rotatably mounted first shutter member having therein pairs of diametrically opposed apertures, a rotatably mounted second shutter member extending within said first shutter member and having an axis of rotation coincident with that of said first shutter member, said second shutter member having at least one aperture extending through the axis of rotation thereof and positioned therein so as to be alignable with different pairs of said diametrically opposite apertures in said first shutter member upon rotation of said first shutter member about said second shutter member, means for locking said second shutter member against rotation in a stationary predetermined position, and means for connecting said first and second shutter members for rotation together as a unitary assembly with said aperture in said second shutter member aligned with a pair of said diametrically opposite apertures in said first shutter member.

2. Means for forming timed indicia on moving film in an oscillograph comprising a light source, means for directing light from said source onto said film, a rotatably mounted tubularly shaped first shutter member positioned with at least a portion thereof in the light path between said source and said film, said first shutter member having a plurality of pairs of diametrically opposed apertures therein positioned so as to be successively alignable in pairs with said light path upon rotation thereof, a rotatably mounted second shutter member extending within said first shutter member and having an axis of rotation coincident with that of said first shutter member, said second shutter member having at least one aperture extending through the axis of rotation thereof and positioned so as to be alignable with different pairs of said diametrically opposite apertures in said first shutter member upon rotation of said first shutter member about said second shutter member, means for locking said second shutter member in a fixed nonrotary position with said aperture therein aligned with said light path between said light source and said film, and means for locking said first and second shutter members for rotation together as a unitary assembly with said aperture in said second shutter member aligned with a pair of said diametrically opposed apertures in said first shutter member.

3. Apparatus for forming timed indicia on moving film in an oscillograph comprising a light source, means for directing light from said source onto said film, a rotatably mounted tubularly shaped first shutter member positioned with at least a portion thereof extending into the light path between said source and said film, a plurality of pairs of diametrically opposed axially extending slot portions in said first shutter member, said slot portions being axially positioned so as to be successively alignable in pairs with said light path upon rotation of said first shutter member, a rotatably mounted second shutter member extending within said first shutter member and having an axis of rotation coincident with that of said first shutter member, at least one slot portion extending through said second shutter member through the axis of rotation thereof and positioned so as to be alignable with different pairs of said diametrically opposed slot portions in said first shutter member, and locking means movable to one position to lock said second shutter member in a stationary position with said slot portion therein aligned with said light path, said locking means being movable to a second position to lock said first and second shutter members together as a unitary assembly with said slot portion in said second shutter member aligned with one of said pairs of diametrically opposed slots in said first shutter member.

4. In an oscillograph in combination with a light source and means for directing light from said source onto moving film in said oscillograph, apparatus for periodically interrupting light from said source between said source and said film to form timed indicia on said film comprising a hollow tubularly shaped first shutter member rotatably mounted in said oscillograph with at least a portion of said first shutter member extending into the light path between said source and said film, a plurality of pairs of diametrically opposed axially extending slot portions positioned in said first shutter member so as to be movable through said light path upon rotation of said first shutter member, drive means for driving said first shutter member at a predetermined substantially constant rotational speed, a rotatably mounted second shutter member extending within said first shutter member and having an axis of rotation coincident with that of said first shutter member, at least one slot portion extending through said second shutter member through the axis of rotation thereof and positioned so as to be alignable with different pairs of said diametrically opposite slot portions in said first shutter member, and locking means movable to one position to lock said second shutter member in a fixed position with said slot portion therein aligned with said light path thereby providing one timed rate at which said light path is periodically interrupted which rate is a function of the number of slot portions in said first shutter member and independent of the number of slot portions in said second shutter member, said locking means being movable to a second position to lock said first and second shutter members together as a unitary rotatable structure with said slot portion in said second shutter member aligned with one of said pairs of diametrically opposite slot portions in said first shutter member thereby providing a second time rate of light interruptions which second rate is a function of the number of slot portions in said second shutter member which are aligned with pairs of diametrically opposite slot portions in said first shutter member and independent of the total number of slot portions in said first shutter member, whereby two separate scales of timed indicia are provided.

5. Apparatus for forming timed indicia on moving film in an oscillograph comprising a light source, means for directing light from said source onto said film, a timing shaft rotatably mounted at opposite ends thereof in the fixed structure of said oscillograph with at least a portion of said shaft extending into the light path between said source and said film, at least one axially extending slot portion passing diametrically through said shaft through the axis of rotation thereof and positioned so as to be alignable with said light path, a rotatably mounted tubularly shaped timing drum extending over a portion of the axial length of said shaft and over at least a portion of the slotted length of said shaft, said drum being rotatably supported at at least one end thereof on said shaft and having an axis of rotation coincident with that of said shaft, a plurality of pairs of diametrically opposed axially extending slot portions in said drum positioned so as to be diametrically alignable in pairs with said slot portion in said shaft, drive means for driving said drum at a predetermined substantially constant rotational speed, and a locking member axially movable on said shaft to one position to lock said shaft in a stationary position with said slot portion therein aligned with said light path thereby providing one timed rate at which said light path is periodically interrupted upon rotation of said drum at said predetermined speed, said rate being a function of the number of slot portions in said drum and independent of the number of slot portions in said shaft, said locking member being axially movable along said shaft from said one position to a second position to lock said drum and said shaft together as a unitary rotatable assembly with said slot portion in said shaft aligned with one of said pairs of diametrically opposite slot portions in said drum thereby providing a second timed rate of light path interruptions upon rotation of said drum and shaft assembly at said predetermined speed, said second rate being a function of the number of slot portions in said shaft which are aligned with pairs of diametrically opposite slot portions in said drum and being independent of the total number of slot portions in said drum, whereby two separate rates of timing indicia are made available.

References Cited in the file of this patent

UNITED STATES PATENTS

| | | |
|---|---|---|
| 2,083,375 | Hehlgans | June 8, 1937 |
| 2,687,337 | Alford | Aug. 24, 1954 |